July 22, 1924.
G. H. TOWNSEND
1,502,071
TEMPERATURE INDICATING AND REGULATING MEANS FOR ENGINE COOLING SYSTEMS
Filed Feb. 14, 1920
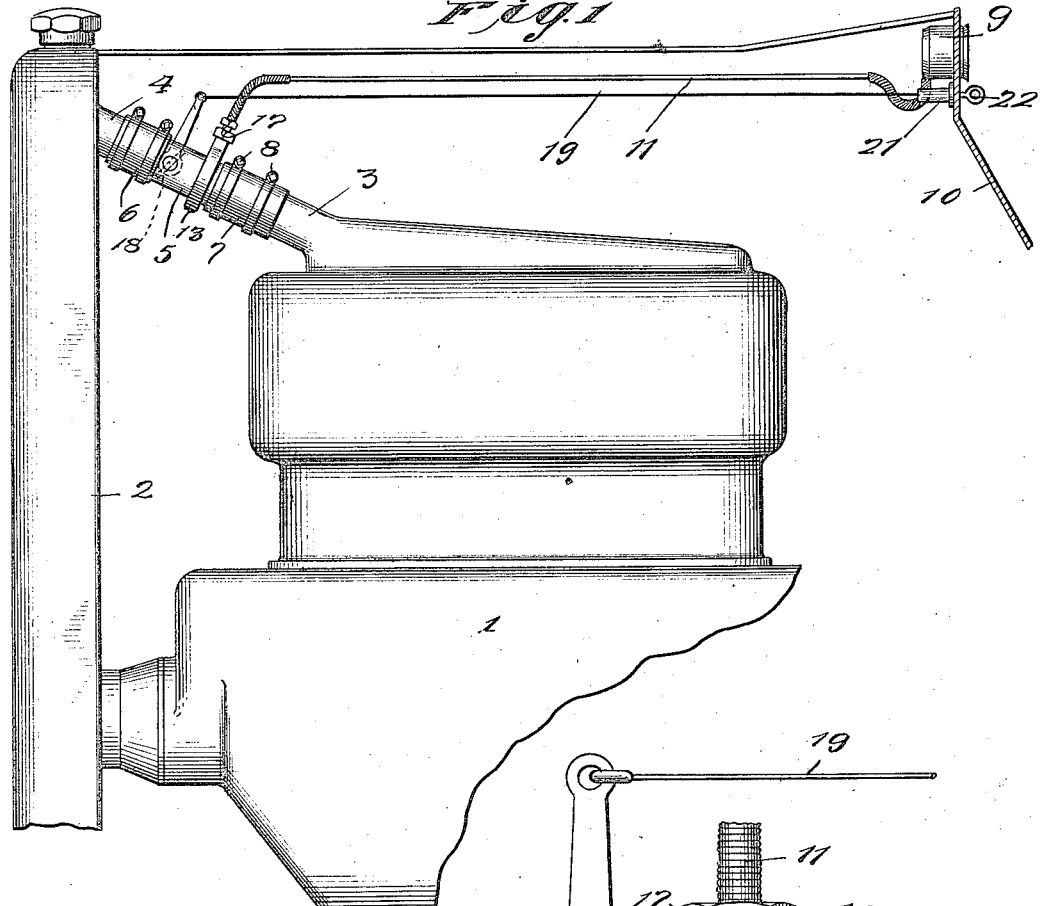
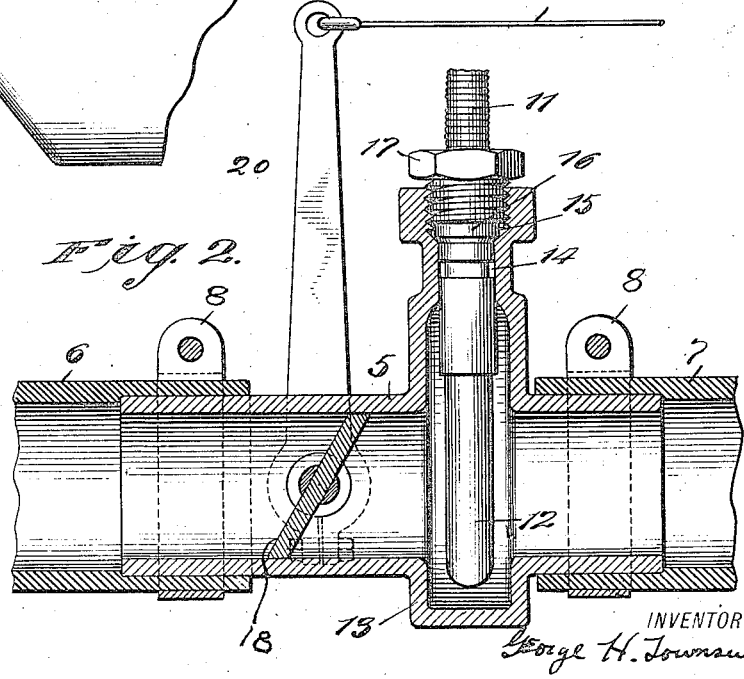
INVENTOR
George H. Townsend
BY
Edmund Quincy Moses
ATTORNEY Patented July 22, 1924.

1,502,071

UNITED STATES PATENT OFFICE.

GEORGE H. TOWNSEND, OF BRONXVILLE, NEW YORK.

TEMPERATURE INDICATING AND REGULATING MEANS FOR ENGINE-COOLING SYSTEMS.

Application filed February 14, 1920. Serial No. 358,683.

*To all whom it may concern:*

Be it known that I, GEORGE H. TOWNSEND, a citizen of the United States, residing in Bronxville, Westchester County, and State of New York, have invented certain new and useful Improvements in Temperature Indicating and Regulating Means for Engine-Cooling Systems, of which the following is a specification.

This invention relates to temperature indicating and regulating means for engine cooling systems and is particularly applicable in connection with engines of the internal combustion type, as used on automobiles, aeroplanes, motorboats and the like.

The invention has for its object, broadly, to provide means for at all times indicating to the operator of the engine the temperature of the cooling fluid in the cooling system of the engine, and to provide means for enabling the operator so to regulate or control the flow of the cooling fluid through the cooling system that the cooling fluid may be maintained at the proper temperature during the operation of the engine, regardless of the outside temperature of the air, thereby insuring that the engine will operate at its highest efficiency. A further advantage attained, by means of my invention, resides in the fact that the circulation of the cooling fluid may be prevented during the starting of the engine, whereby it will warm up and function efficiently in a much shorter interval of time than is the case where free circulation of the cooling fluid is permitted during the starting operation. Furthermore, as the operator is able at all times to ascertain the temperature of the cooling fluid, he can tell at a glance when the same has been heated to the proper operating temperature, whereupon he may permit the circulation of the cooling fluid through the cooling system, and the rapidity of the flow of the fluid may be so controlled that the temperature thereof may be maintained substantially constant during varying speeds of the engine.

The invention further has for its object to provide means of the character above set forth which is simple and economical to manufacture, which is positive and efficient in use, and which may be readily and quickly installed in the cooling systems of engines with the minimum amount of alterations to the existing structure, whereby the cost of installation, including the cost of labor, is practically negligible.

Other objects of the invention are in part obvious and in part pointed out hereinafter.

In the accompanying drawings, forming a part of this specification,

Figure 1 is a diagrammatic side elevation illustrating the engine and cooling system of an automobile, or other vehicle, and showing a preferred application of the invention thereto;

Figure 2 is a longitudinal sectional view of a duct section having included therein a preferred form of device constructed in accordance with and embodying my invention.

Referring to the drawings, in which I have shown in Figure 1 the application of the invention to the return pipe of a vehicle engine cooling system, 1 designates an engine of any approved type, which is provided with the usual water jacket from which the heated cooling fluid is returned to the upper end of a radiator 2, of any approved construction, through a pipe section 3 connected to the engine 1, a pipe section 4 connected to the radiator 2, and intermediate sections hereinafter described. The fluid, which is cooled as it passes down through the radiator, passes from the lower end thereof to the water jacket of the engine by means of the usual inlet pipe, not shown.

In accordance with the usual practice, the pipe sections 3 and 4 are connected to one another by a flexible section, such as rubber hose, and in applying my invention to the cooling system of the engine, I take advantage of this flexible section to provide for the mounting of my device in the cooling system without necessitating any machine work upon the engine or the cooling system, or the drilling of holes in any of the metal parts thereof. This result is accomplished by cutting out an intermediate portion of the flexible section and introducing the device embodying the invention between the end portions thereof.

As shown in the drawings, I provide a fitting 5 having a hollow body portion with a passage extending therethrough and having its end portions in the form of tubular extensions of substantially the same diameters as the diameters of the pipe sections 3 and 4. The fitting 5 is connected to the pipe sections 3 and 4 by short flexible hose sections 6 and 7, which are secured to the fitting 5 and to the pipe sections 3 and 4 by hose clamps 8 of any suitable type. It will thus be seen that the fitting 5 is firmly introduced into the cooling system to form a part of the return duct for the cooling fluid, without necessitating any change in any part of the engine or its cooling system except the usual flexible return hose section, from which the intermediate part thereof may be cut out or removed without difficulty.

For purposes of illustration I have shown a temperature indicating instrument provided with an indicating gage 9, mounted upon the vehicle dash 10 or in any other suitable place, and connected by a capillary tube 11 to a temperature responsive element, preferably in the form of a fluid filled bulb 12, adapted to be received within the fitting 5 and to be held therein in the path of the cooling fluid passing through the return duct. In order to insure a free flow of the cooling fluid through the return pipe, the portion of the fitting 5 which receives the bulb 12, is preferably enlarged, as indicated at 13, to an extent such that the effective cross sectional area thereof, when the bulb 12 is in place, is at least equal to the cross sectional area of the end portions of the fitting. An opening 14, thru a neck projecting from the wall of the body portion of the fitting 5 and communicating with the enlarged portion 13 thereof, is provided with a seat 15 adapted to be engaged by a flange 16 at the upper end of the bulb 12. The bulb 12 is passed through the opening 14 and is held in position within the enlarged portion 13 of the fitting 5, with the flange 16 tightly engaging the seat 15, by means of a nut 17, surrounding the capillary tube 11, and engaging a thread formed in the outer portion of the opening 14.

In order to permit the rate of flow of the cooling fluid through the return duct of the cooling system to be varied, a butterfly valve 18 is adjustably mounted within the body portion of the fitting 5. This valve in its wide open position interferes practically not at all with the flow of the cooling fluid through the system; and in its closed position, except for slight leakage, substantially prevents the circulation of cooling fluid. Actuation of the valve 18 from the outside of the fitting may be effected by any suitable means, as for example, by an actuating rod 19 having one of its ends operatively connected to the valve by an arm 20 fixed to the shaft of the valve and having its other end slidingly supported within and extending through a sleeve 21 secured to the dash 10. At its inner end, the rod 19 is provided with a handle 22 by means of which it may be actuated by the operator when it is desired to vary the position of the valve 18. To insure that the temperature indicating device will at all times indicate the temperature of the cooling fluid after it has been heated by contact with the walls of the engine cylinders within the water jacket of the engine, irrespective of the position of the valve 18, the bulb 12 is positioned between the valve and the engine. This is an important feature, as by placing the bulb in advance of the valve with respect to the direction of the flow of the cooling fluid the valve may be entirely closed without preventing the operation of the temperature indicating instrument, whereas if the bulb 12 were placed beyond the valve 18, the temperature indicating instrument obviously could not record the temperature of the heated fluid when the valve was in its closed position. The recording of the temperature of the cooling fluid after being heated by contact with the walls of the cylinders is of extreme importance upon starting the engine during cool weather. In such instance the valve 18 is closed, thereby substantially preventing circulation of the cooling fluid throughout the system, and the engine is started. As the free flow of the cooling fluid is prevented it follows that the engine will warm up and commence running properly far more quickly than if the fluid is permitted to flow freely through the system, and the operator by watching the gage 9, can tell when the fluid has been raised to the proper temperature to permit efficient operation of the engine, whereupon he opens the valve 18 to permit the fluid to circulate through the cooling system in the usual manner. If the temperature indicating instrument was not employed, the operator would have no means of knowing when to open the valve, and consequently he might open the same too soon, thereby permitting the engine to operate below its maximum efficiency, or he might delay opening the valve until the fluid had been overheated, which might result in damage to the engine or the cooling system.

During the running of the vehicle the operator, by manipulating the valve actuating rod 19, may so vary the flow of the cooling fluid through the cooling system that the temperature of the fluid will be maintained substantially constant. Should the gage 9 indicate a rise in the temperature of the cooling fluid above the normal operating temperature, the valve is opened to permit a more rapid flow of the fluid as a result of which its temperature will be lowered. On the other hand, if the gage 9 indicates a drop in the temperature of the fluid, the partial closing of the valve will effect a rise of the temperature by retarding the flow of the fluid.

By placing the valve and the bulb of the temperature indicating device within a single fitting, which is connected by flexible sections to other parts of the cooling system, the valve and bulb will always be maintained in proper operative relation to one another, even though the parts of the cooling system to which the fitting is connected should move relatively to one another. Furthermore, the fitting will be held sufficiently rigid to insure that the valve may at all times be operated by its actuating rod.

While I have illustrated and described in detail one preferred form and application of my invention, it will be understood that the invention may be modified in various ways and I do not therefore wish to be limited to the particular construction shown, but intend to cover my invention broadly in whatever form its principle may be embodied.

Having thus described my invention, I claim:—

1. In combination with an internal combustion engine having a water cooling system including a radiator, a fitting adapted to be inserted in the water cooling system between the engine and the radiator, comprising a hollow body portion, a tubular extension at each side thereof adapted to receive a hose, said body portion having an opening therein adapted to receive a temperature responsive element which will be influenced by the temperature of the cooling water, a valve located in said hollow body portion and adapted to control the flow of water therethru, and means operable from the outside of said fitting for controlling the position of said valve.

2. In combination with an internal combustion engine having a water cooling system including a radiator, a fitting adapted to be inserted in the water cooling system between the engine and the radiator, comprising a hollow body portion, a tubular extension at each side thereof adapted to receive a hose, a neck projecting from the body portion and adapted to receive a temperature responsive element which will be influenced by the temperature of the cooling water, a valve located in said hollow body portion and adapted to control the flow of water therethru, said neck being located in advance of said valve with respect to the direction of the flow of the cooling water, and means manually operable from the outside of said fitting for controlling the position of said valve.

3. A fitting adapted to be inserted in the water cooling system of an internal combustion engine, comprising a hollow body portion, a tubular extension at each side thereof adapted to receive a hose, said body portion being formed to receive a temperature responsive element for indicating the temperature of the cooling water passing thru the fitting, a valve located within said hollow body portion and adapted to control the flow of cooling water thru the fitting, and means operable from the outside of said fitting for controlling the position of said valve.

GEORGE H. TOWNSEND.